No. 677,710. Patented July 2, 1901.
G. B. STACY.
AIR PUMP FOR PNEUMATIC TIRES.
(Application filed Nov. 13, 1900.)
(No Model.)
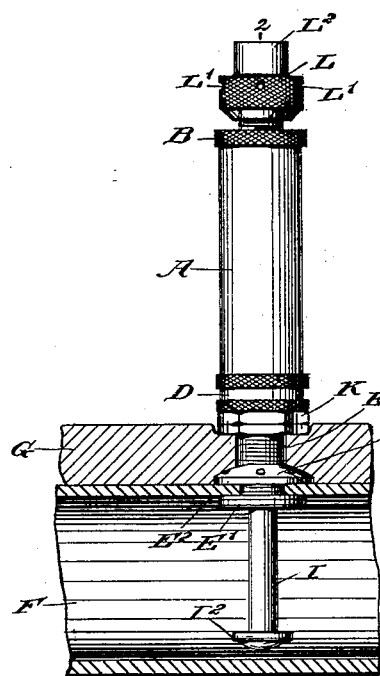
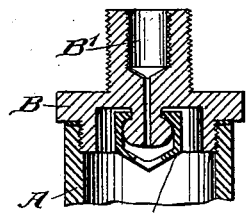
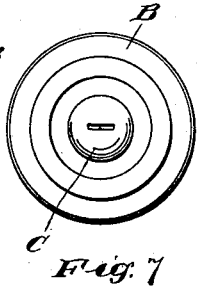
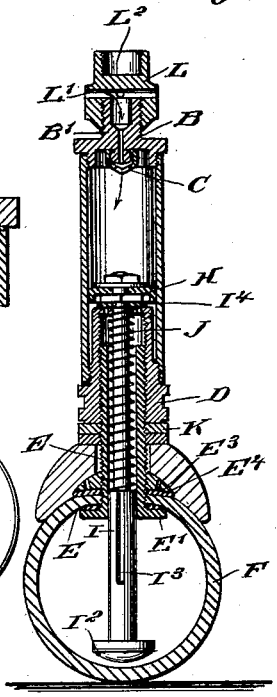
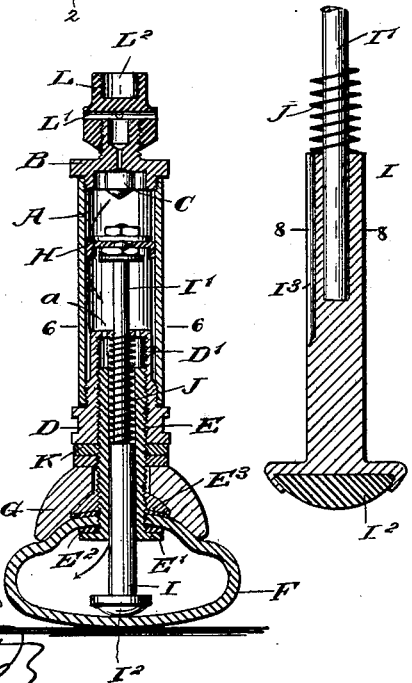
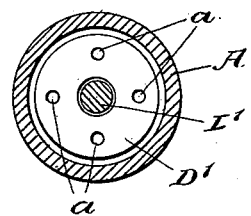
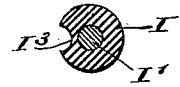
WITNESSES:
INVENTOR
George B. Stacy
BY
ATTORNEYS

UNITED STATES PATENT OFFICE.

GEORGE BLAIR STACY, OF BOSTON, MASSACHUSETTS, ASSIGNOR TO ALEXANDER H. SPENCER, OF NEW YORK, N. Y.

AIR-PUMP FOR PNEUMATIC TIRES.

SPECIFICATION forming part of Letters Patent No. 677,710, dated July 2, 1901.

Application filed November 13, 1900. Serial No. 36,357. (No model.)

*To all whom it may concern:*

Be it known that I, GEORGE BLAIR STACY, a citizen of the United States, and a resident of Boston, in the county of Suffolk and State of Massachusetts, have invented a new and Improved Air-Pump for Pneumatic Tires, of which the following is a full, clear, and exact description.

The invention relates to air-pumps automatically operated by motion derived from displacement of the tire under pressure.

The object of the invention is to provide a new and improved air-pump for pneumatic tires which is simple and durable in construction, very effective in operation, arranged to avoid leakage, and insure pumping of a sufficient quantity of air into the tire to keep the tire inflated in case of a puncture or other leakage and while the vehicle is in use.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied, the tire and rim being shown in section. Fig. 2 is a transverse section of the same on the line 2 2 in Fig. 1. Fig. 3 is a similar view of the same with the parts in a different position. Fig. 4 is an enlarged sectional side elevation of the upper end of the barrel, the end having the suction-valve. Fig. 5 is an inverted plan view of the barrel-head and suction-valve. Fig. 6 is an enlarged sectional plan view of the barrel, the section being on the line 6 6 in Fig. 3. Fig. 7 is an enlarged sectional side elevation of part of the plunger and stem, and Fig. 8 is a sectional plan view of the same.

The cylinder or barrel A of the air-pump is provided with an outer head B, containing a suction-valve C, and on the inner end of said barrel is secured an inner head D, screwing on an externally-threaded sleeve E, fastened to the tire F at the rim G, as is plainly indicated in the drawings. The inner end of the sleeve E is formed with a flange E', resting on a washer $E^2$, seated on the inside of the tire F, and a nut $E^3$ screws on the sleeve E and abuts against a washer $E^4$, fitted on the outside of the tire F opposite the washer $E^2$. By screwing up the nut $E^3$ the sleeve E is secured to the tire F, the nut $E^3$ fitting in a corresponding recess in the rim G.

Within the barrel A is arranged to reciprocate a plunger H of the usual cup form and secured on the outer end of a plunger-stem I extending through the head D and sleeve E into the tire F, as shown in Figs. 1, 2, and 3. The plunger H is secured on the reduced end I' of the stem I, and on this reduced portion is coiled a spring J, resting on a shoulder formed between the reduced portion and the main part of the stem I, said spring serving to normally hold the plunger seated against the inner reduced end of the head D to close the ports $a$ by a washer $I^4$, to limit the movement of the plunger, and to hold the end of the stem I the desired distance in the tire F, as is plainly indicated in Figs. 1 and 2. The inner end of the stem I is provided with a button $I^2$, adapted to be engaged by the wall of the tire F when the latter is deflated by reason of a puncture or other cause, and the tire yields inward upon the pump moving into a lowermost position with the wheel, (see Fig. 3,) so that the stem I is forced inward, and with it the plunger H, to cause the air contained in the inner portion of the barrel A to move past the cup-plunger H into the outer portion of the cylinder or barrel A, as indicated by the arrow in Fig. 3. When this movement takes place, the spring J is compressed, and when the pump moves out of a lowermost position upon a further turning of the wheel of the vehicle then the spring imparts a return movement to the stem I and plunger H, so that the air in the outer portion of the cylinder A is forced by the plunger through ports $a$ into the interior of the head D and from the latter into the sleeve E and then through a recess $I^3$ into the interior of the tire F to inflate the same. The recess $I^3$ extends from the shoulder of the stem I toward the button $I^2$ a distance sufficient to establish communication at all times with the interior of the tire F to allow the air to pass into the tire upon the movement of the plunger H, as described. When the spring J forces the stem I outward, then the plunger H sucks in air through the head B and the suction-valve C, and when the stem I, with the plunger H, is again moved inward by the action of the tire F, as shown in Fig. 3, then the previously-drawn-in air is forced past the plunger H into the outer end of the cylinder A, and when the spring J moves the plunger H back to its normal position (shown in Fig. 2) then the air is forced out of the barrel by the plunger into the tire F to inflate the same, as previously mentioned. Thus it is expressly understood that the action of the spring J causes a return movement of the plunger to force the air into the tire F.

In order to permit adjustment of the pump to tires of different diameters, it is necessary to screw the head D on the sleeve E such a distance as to project the button end of the stem I the desired distance into the tire F. When this adjustment has been made, the head D, and with it the barrel A, is locked in position on the sleeve E by nuts K, one of which is a jam-nut.

In order to insure proper guiding of the stem I, the reduced end thereof fits snugly in a corresponding bore in the end of the head D, the large bore of the head serving as a passage to conduct the air from the cylinder by way of the ports a to the interior of the sleeve E and to the recess I³. The suction-valve C is preferably in the form of a rubber cup having a slit; but I do not limit myself to this particular construction.

On the threaded inlet end B' of the head B screws a cap L, having an air-inlet passage and a threaded end L², for completely closing the head B when the cap is screwed in a reverse position on the said head B. When the cap L is removed from the threaded end B' of the head B, then the discharge end of an ordinary bicycle-pump can be coupled to the said head to fill the tire with air by the use of said pump.

By the construction described a very effective pump is produced which is not liable to get out of order and not liable to cause leakage of the air from the tire.

Having thus fully described my invention, I claim as new and desire to secure by Letters Patent—

1. A pump for pneumatic tires, comprising a sleeve for attachment to the rim and tire of a wheel, a barrel having an outer and an inner head, of which the outer head contains a suction-valve and the inner head is adjustably attached to said sleeve, the inner head projecting into the barrel and having an internal passage for the air and ports leading from the passage through the inner end of the head into the barrel, a plunger operating in said barrel and adapted to be seated on the inner end of said inner head, to limit the movement of the plunger and its stem in an outward direction, the stem of the plunger extending through the sleeve into the tire, and a spring pressing the stem to hold the plunger normally to its seat in the said head, the said stem having its inner enlarged portion formed with a longitudinally-extending groove opening into the tire, as set forth.

2. A pump for pneumatic tires, comprising a sleeve secured to the rim and tire of a wheel, a barrel having an outer and an inner head, of which the outer head contains an air-suction valve and the inner head has a threaded bore for screwing on said sleeve and a small bore for the passage of the plunger-stem, the inner end of said head projecting into the barrel and having ports leading to the threaded bore, a plunger in said barrel and having its stem consisting of a grooved portion opening into the tire and the bore of the sleeve, to establish communication between the barrel and the tire, said stem also having a reduced portion fitted in the small bore of said inner head, and a coil-spring on the reduced portion of the stem for pressing said plunger and holding the latter normally seated on the end of the barrel-head, to close the parts thereof, as set forth.

In testimony whereof I have signed my name to this specification in the presence of two subscribing witnesses.

GEORGE BLAIR STACY.

Witnesses:
JOHN K. BERRY,
FRANK H. BETTAIR.